(12) United States Patent
Mizuno

(10) Patent No.: US 9,668,046 B2
(45) Date of Patent: May 30, 2017

(54) NOISE REDUCTION CONTROL DEVICE AND CONTROL METHOD

(71) Applicant: Panasonic Intellectual Property Corporation of America, Torrance, CA (US)

(72) Inventor: Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 126 days.

(21) Appl. No.: 14/433,038

(22) PCT Filed: May 20, 2014

(86) PCT No.: PCT/JP2014/002645
§ 371 (c)(1),
(2) Date: Apr. 2, 2015

(87) PCT Pub. No.: WO2014/207990
PCT Pub. Date: Dec. 31, 2014

(65) Prior Publication Data
US 2015/0256928 A1  Sep. 10, 2015

(30) Foreign Application Priority Data

Jun. 27, 2013 (JP) .................. 2013-135217

(51) Int. Cl.
*H04R 29/00* (2006.01)
*A61F 11/06* (2006.01)
(Continued)

(52) U.S. Cl.
CPC ............. *H04R 3/002* (2013.01); *G01S 15/08* (2013.01); *G01S 15/325* (2013.01); *G01S 15/42* (2013.01);
(Continued)

(58) Field of Classification Search
CPC .......... H04R 3/002; H04R 3/005; H04R 1/08; H04R 29/00; H04R 2410/01;
(Continued)

(56) References Cited

U.S. PATENT DOCUMENTS

| 5,267,320 A | * | 11/1993 | Fukumizu | .......... G10K 11/1784 |
| | | | | 381/71.12 |
| 8,401,513 B2 | * | 3/2013 | Langereis | ................ G01S 15/06 |
| | | | | 367/118 |
| 2004/0234080 A1 | | 11/2004 | Hernandez et al. | |

FOREIGN PATENT DOCUMENTS

JP   6-051786   2/1994

OTHER PUBLICATIONS

Extended European Search Report dated May 17, 2016 for European Patent Application No. 14817697.7.
(Continued)

*Primary Examiner* — Vivian Chin
*Assistant Examiner* — Douglas Suthers
(74) *Attorney, Agent, or Firm* — Greenblum & Bernstein, P.L.C.

(57) ABSTRACT

A noise reduction control apparatus and method for detecting a noise signal with a microphone and generating a first control sound for attenuating the noise signal based on control characteristics of a control filter. Further, the first control sound is emitted and measured during a first period. By measuring a sound reflected from an object, a position of the object is estimated. Using the estimated position of the object, the noise is attenuated at the estimated position. Accordingly, it is possible to continuously reduce noise at an estimated position of an object.

6 Claims, 7 Drawing Sheets

(51) Int. Cl.
  *G10K 11/16* (2006.01)
  *H03B 29/00* (2006.01)
  *H04B 15/00* (2006.01)
  *H04R 3/00* (2006.01)
  *G01S 15/08* (2006.01)
  *G01S 15/42* (2006.01)
  *G10K 11/178* (2006.01)
  *H04R 1/08* (2006.01)
  *G01S 15/32* (2006.01)
  *G01S 15/88* (2006.01)
  *G10K 11/18* (2006.01)

(52) U.S. Cl.
  CPC ............ *G01S 15/88* (2013.01); *G10K 11/178* (2013.01); *H04R 1/08* (2013.01); *H04R 3/005* (2013.01); *H04R 29/00* (2013.01); *G10K 11/18* (2013.01); *G10K 2210/128* (2013.01); *G10K 2210/3016* (2013.01); *G10K 2210/3226* (2013.01); *H04R 2410/01* (2013.01); *H04R 2410/05* (2013.01); *H04R 2499/13* (2013.01)

(58) Field of Classification Search
  CPC . H04R 2410/05; H04R 2499/13; G01S 15/08; G01S 15/325; G01S 15/42; G01S 15/88; G10K 11/178; G10K 2210/128; G10K 2210/3016; G10K 2210/3226
  USPC ........................................ 381/56, 71.1, 94.7
  See application file for complete search history.

(56) References Cited

OTHER PUBLICATIONS

International Search Report of PCT application No. PCT/JP2014/002645 dated Aug. 12, 2014.

\* cited by examiner

FIG. 5A
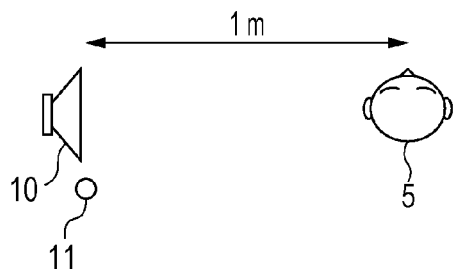
FIG. 5B
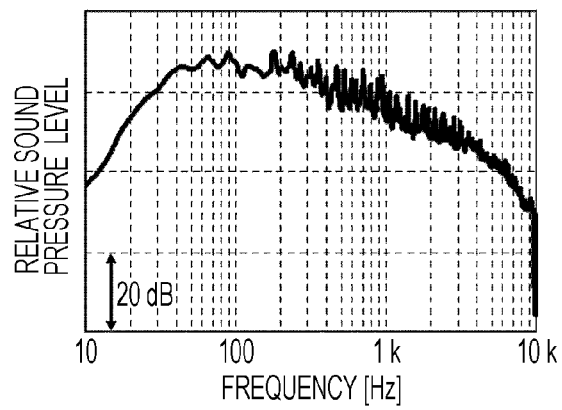
FIG. 6
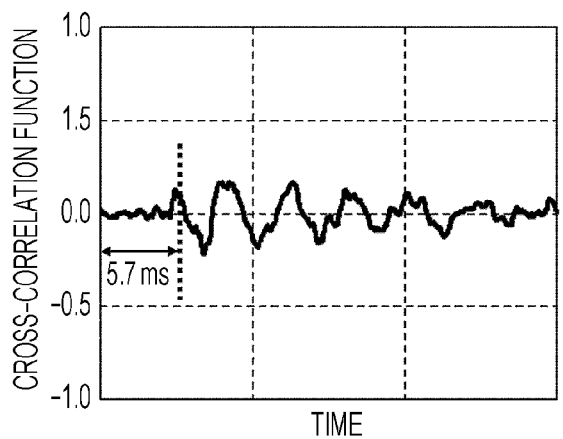
FIG. 7A
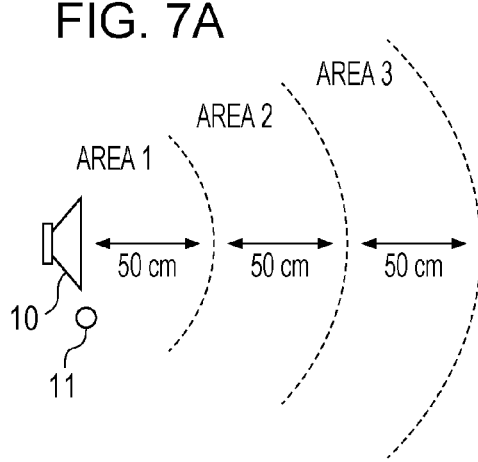
FIG. 7B
| AREA | COEFFICIENT |
|---|---|
| AREA 1 (DISTANCE ≤ 50 cm) | G1 |
| AREA 2 (50 cm < DISTANCE ≤ 1 m) | G2 |
| AREA 3 (1 m < DISTANCE ≤ 1.5 m) | G3 |

US 9,668,046 B2

NOISE REDUCTION CONTROL DEVICE AND CONTROL METHOD

TECHNICAL FIELD

The present disclosure relates to an active noise control apparatus for reducing noise in a desired space.

BACKGROUND ART

An active noise control apparatus in related art detects the position of a person and controls an output sound to reduce noise at a desired position (for example, refer to PTL 1).

As illustrated in FIG. 1, an apparatus of reducing vehicle interior noise in the related art is capable of identifying a position where noise should be reduced using a passenger position sensor and generating an optimal control sound signal. As a result, the apparatus is capable of reducing the noise at each passenger position regardless of the number of passengers and the combination of the positions of the passengers.

CITATION LIST

Patent Literature

PTL 1: Japanese Unexamined Patent Application Publication No. 6-51786

SUMMARY OF INVENTION

An active noise control apparatus of the present disclosure includes a first microphone that detects a measuring sound and a noise; a controller that generates a first control sound for attenuating the noise component detected by the first microphone on the basis of control characteristics; a speaker that emits the first control sound generated by the controller and the measuring sound during a first period; and a position estimating unit that estimates the position of an object on the basis of a reflected sound after the measuring sound is reflected from the object. The position estimating unit determines the control characteristics of the controller so as to attenuate the noise at the estimated position. The speaker emits a second control sound based on the control characteristics determined by the position estimating unit during a second period different from the first period.

With the above configuration, it is possible for a user to continuously gain the noise reduction effect regardless of the position of the user.

BRIEF DESCRIPTION OF DRAWINGS

FIG. 5A illustrates the positional relationship among the control speaker, the error detection microphone, and the head of the passenger.

FIG. 5B illustrates amplitude-frequency characteristics of the measuring sound.

FIG. 6 illustrates the result of analysis of a cross-correlation function.

FIG. 7A illustrates the relationship between each distance and the area where the head 5 of the passenger exists.

FIG. 7B illustrates the digital filter coefficient corresponding to each area.

DESCRIPTION OF EMBODIMENTS (Underlying Knowledge Forming Basis of the Present Disclosure)

Figure 1:
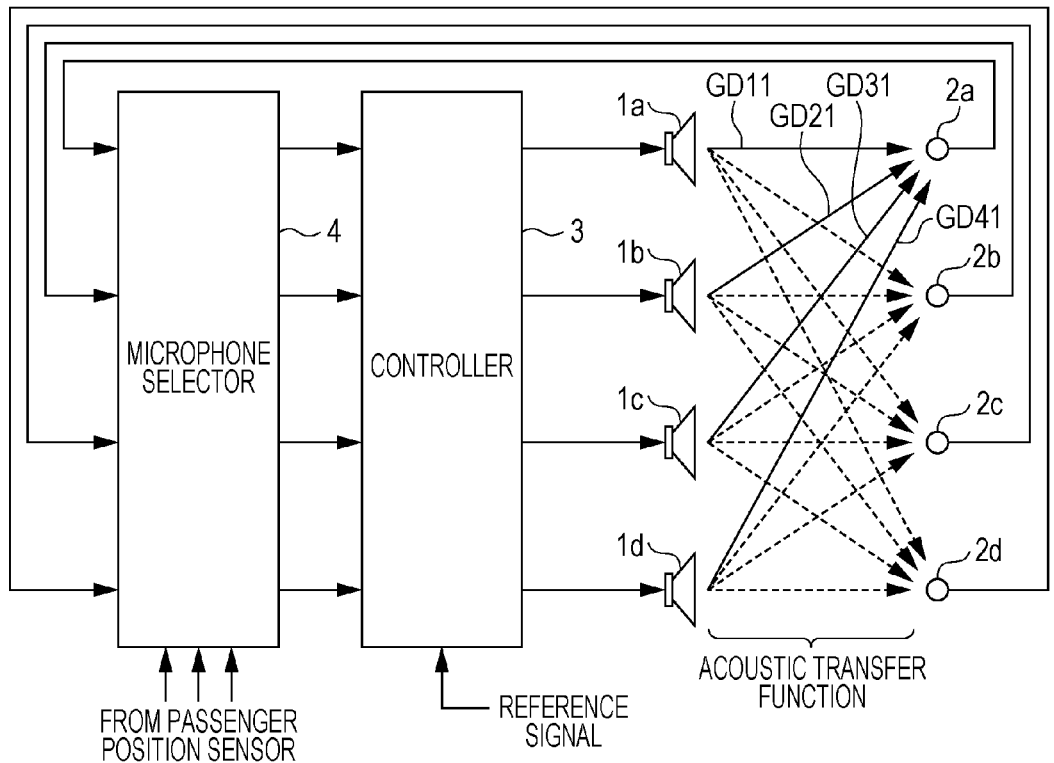
FIG. 1 illustrates a configuration of an apparatus of reducing vehicle interior noise in the related art.

FIG. 1 illustrates a configuration of the apparatus of reducing the vehicle interior noise (caused by an engine signal) in the related art described in PTL 1.

Reference numerals $1a$ to $1d$ denote four control speakers that are provided, in the vehicle interior and that each emit a sound having a phase opposite to that of noise. Reference numerals $2a$ to $2d$ denote four error detection microphones that are provided near the respective seats in the vehicle interior and that each detect a noise control error. Reference numeral 3 denotes a controller that generates a signal of a control sound emitted from each of the control speakers $1a$ to $1d$ using a detected signal of engine vibration as a reference signal. Reference numeral 4 denotes a microphone selector that supplies information about and an output signal from the error detection microphone at the seat on which the passenger seats to the controller 3 on the basis of a detected signal detected by a seat-belt wearing detection unit (a passenger position sensor).

Acoustic transfer functions GD to be supplied from each of the control speakers $1a$ to $1d$ to the error detection microphones $2a$ to $2d$ are stored in the controller 3 in advance. The controller 3 generates a control sound signal for reducing the output signal from the error detection microphone at the position where the noise should be reduced on the basis of the information about the error detection microphone supplied from the microphone selector 4. The configuration illustrated in FIG. 1 indicates a case in which the error detection microphone $2a$ is selected by the microphone selector 4. The controller 3 generates the control sound signal with a known filtered-X least-mean-square (LMS) algorithm using acoustic transfer functions $GD11$, $GD21$, $GD31$, and $GD41$ supplied from the control speakers $1a$ to $1d$ to the error detection microphone $2a$.

As illustrated in FIG. 1, the apparatus of reducing the vehicle interior noise in the related art is capable of identifying the location where the noise should be reduced using the passenger position sensor and generating an optimal control sound signal. As a result, the apparatus is capable of reducing the noise at each passenger position regardless of the number of passengers and the combination of the positions of the passengers.

However, with the above configuration, since the positions of the ears of the passenger are apart from the error detection microphone if the posture and/or the body shape at the passenger are different from standard conditions, it is not possible to constantly reduce the noise at the position of the head of the passenger. Accordingly, constant reduction of the noise at the position of the head of the passenger regardless of the posture and/or the body shape of the passenger has a challenge to recognize the relative positional relationship between the control speaker and the position of the head of the passenger in order to optimally generate the control sound signal. In order to resolve this problem, for example, a configuration may be considered in which a camera is provided in the vehicle interior, a video captured by the camera is analyzed to recognize a detailed position of the passenger, and the control sound signal for reducing the noise is optimally generated. However, new problems including the provision of the camera in the vehicle interior and the necessity of a to of signal processing for image recognition are caused.

In order to resolve the above problems, there is provided an active noise control apparatus including a first microphone that detects a measuring sound and a noise; a controller that generates a first control sound for attenuating the noise component detected by the first microphone on the basis of control characteristics; a speaker that emits the first control sound generated by the controller and the measuring sound during a first period; and a position estimating unit that estimates the position of an object on the basis of a reflected sound after the measuring sound is reflected from the object. The position estimating unit determines the control characteristics of the controller so as to attenuate the noise at the estimated position. The speaker emits a second control sound based on the control characteristics determined by the position estimating unit during a second period different from the first period.

The position estimating unit may calculate the difference from the time when the measuring sound is emitted from the speaker to the time when the reflected sound of the measuring sound component is detected by the first microphone and may estimate the position of an object on the basis of the difference in time.

The measuring sound may be the noise that is recorded in advance.

The position estimating unit may include a signal analyzing portion that calculates the difference from the time when the measuring sound is emitted from the speaker to the time when the measuring sound component is detected by the first microphone and estimates the position of an object on the basis of the difference in time; and a coefficient setting portion that calculates a coefficient used by the controller to calculate the second control sound on the basis of the position of the object estimated by the signal analyzing portion.

The signal analysis portion may include a memory that stores the noise detected by the first microphone as the measuring sound; an analyzer that calculates a cross-correlation function between the measuring sound that is stored in the memory and than is output from the speaker and the reflected sound supplied from the first microphone; and an estimator that estimates the distance between the first microphone and an object from the cross-correlation function calculated by the analyzer.

The estimator may estimate the distance between the first microphone and the object using a minimum time at which the cross-correlation function has a high value as a reflected sound arrival time.

The control apparatus may further include a second microphone different from the first microphone. The direction of an object may be detected from the difference between the arrival times of the reflected sound to the first microphone and the second microphone.

A control method of the present disclosure is a control method of controlling a control apparatus including a microphone, a controller, a speaker, and a position estimating unit. The control method may include detecting a noise with the microphone; generating a first control sound for attenuating the noise with the controller; emitting the first control sound and a measuring sound during a first period with the speaker; and calculating the difference from the time when the measuring sound is emitted to the time when a reflected sound of the measuring sound component is detected by the microphone with the position estimating unit, estimating the position of an object on the basis of the difference in time with the position estimating unit, determining control characteristics for generating a second control sound for attenuating the noise at the estimated position with the position estimating unit, and emitting the second control sound based on the control characteristics determined by the position estimating unit during a second period different from the first period with the speaker.

It should be noted that general or specific embodiments may be realized as a system, a method, an integrated circuit, a computer program, storage media, or any elective combination a system, an apparatus, a method, an integrated circuit, a computer program, storage media.

Embodiments of the present disclosure will herein be described with reference to the attached drawings.

(First Embodiment)

Figure 2:
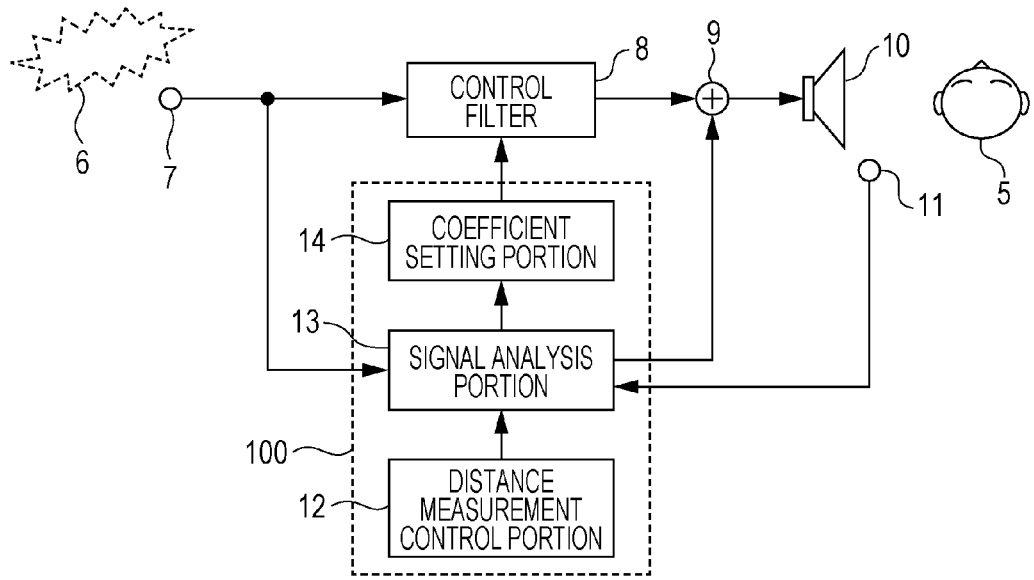
FIG. 2 illustrates a configuration of an active noise control apparatus according to a first embodiment of the present disclosure.

FIG. 2 illustrates a configuration of an active noise control apparatus according to a first, embodiment of the present disclosure. The active noise control apparatus in the present embodiment includes a noise detection microphone 7, a control filter 8, an adder 9, a control speaker 10, an error detection microphone 11, and an object position estimating unit 100. The object position estimating unit 100 includes a distance measurement control portion 12, a signal analysis portion 13, and a coefficient setting portion 14. These components are only examples and part of the components may be omitted. The respective components will now be described.

Reference numeral 5 denotes the head of a passenger which is the target of noise reduction. Reference numeral 6 denotes a noise source. Reference numeral 7 denotes the noise detection microphone that is provided near the noise source and that detects a noise signal. Reference numeral 8 denotes the control filter that performs digital filtering to the noise signal detected by the noise detection microphone 7 to generate a control sound signal. Reference numeral 9 denotes the adder that adds a measuring sound signal described below to the control sound signal. Reference numeral 10 denotes the control speaker that acoustically radiates the signal resulting from the addition in the adder 9. Reference numeral 11 denotes the error detection microphone provided near the control speaker 10. Reference numeral 12 denotes the distance measurement control portion that controls an operation to measure the distance between the head. 5 of the passenger and the control speaker 10. Reference numeral. 13 denotes the signal analysis portion that estimates the distance between the head 5 of the passenger and the control speaker 10 on the basis of the noise signal, a detected signal by the error detection microphone 11, and a control signal from the distance measurement control portion 12. Reference numeral 14 denotes the coefficient setting portion that sets a digital filter coefficient of the control filter 8 on the basis of the result of the estimation by the signal analysis portion. Although the noise detection microphone 7 and the error detection microphone 11 are described as separate components, the same microphone may be used as the noise detection microphone 7 and the error detection microphone 11.

A noise control operation in the configuration illustrated in FIG. 2 will now be described.

During an initial period of the noise control operation, the digital filter coefficient using the position of the error detection microphone 11 as a noise reduction position is set in the control filter 8.

Figure 3:
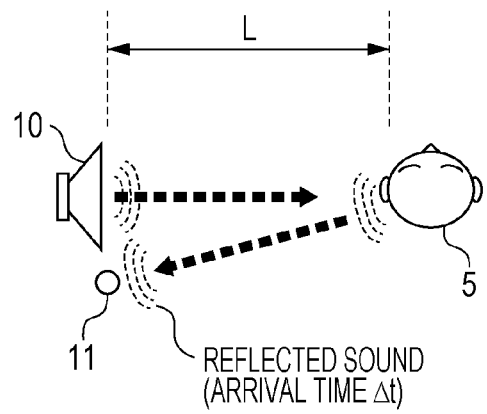
FIG. 3 illustrates the relationship between reflection of a measuring sound and distance estimation.

After a certain time, the signal analysis portion 13 concurrently starts an operation to measure the distance between the control speaker 10 and the head 5 of the passenger under the control of the distance measurement control portion 12. The distance is indirectly measured by measuring the time during which a measuring sound emitted from the control speaker 10 is reflected from the head 5 of the passenger and reaches the error detection microphone 11. FIG. 3 illustrates the relationship between the reflection of the measuring sound and the distance estimation. A distance L is calculated according to $L \cong \Delta t \times C/2$ when the control speaker 10 is adjacent to the error detection microphone 11, where L denotes the distance between the control speaker 10 and the head 5 of the passenger, $\Delta t$ denotes a reflected sound arrival time, and C denotes acoustic velocity.

Figure 4:
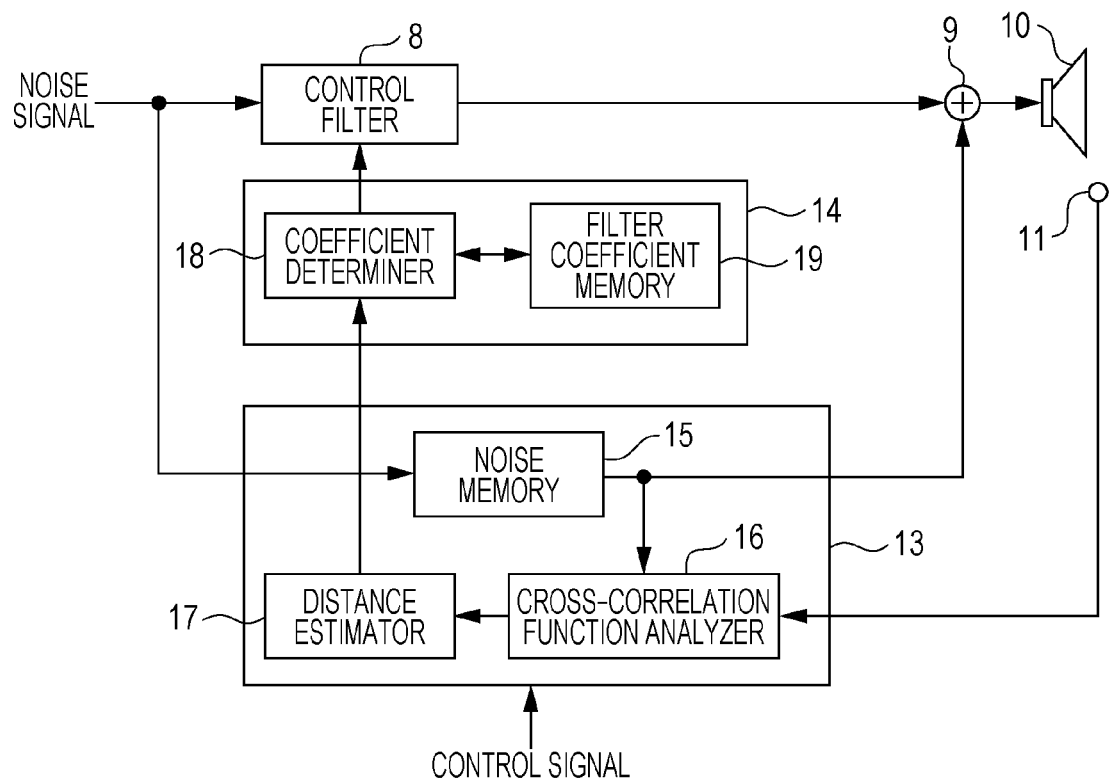
FIG. 4 illustrates the configurations of a signal analysis portion and a coefficient setting portion.

The configurations of the signal analysis portion 13 and the coefficient setting portion 14 are illustrated in FIG. 4. The signal analysis portion 13 stores the noise signal for a certain period of time in a noise memory 15. The noise signal stored in the noise memory 15 is supplied to the adder 9 and a cross-correlation function analyzer 16 after a certain time as the measuring sound signal. The measuring sound signal supplied to the adder 9 is emitted from the control speaker 10, is reflected from the head 5 of the passenger, and is detected by the error detection microphone 11. Since a control sound for setting the position of the error detection microphone 11 as the noise reduction position is continuously emitted although the noise emitted from the noise source 6 comes close to the error detection microphone 11 at this time, the noise is cancelled out by the control signal near the error detection microphone 11 and only the reflected sound of the measuring sound can be detected with high accuracy. Although the signal analysis portion. 13 is described to store the noise signal for the certain period of time the certain period of time is not specifically limited. It is sufficient for the noise signal to be stored for a minimum period of time during which the noise signal can be output as the measuring sound and the reflected sound can be detected by the error detection microphone 11. Although the noise signal stored in the noise memory 15 is described to be output after the certain time, the certain time is also not specifically limited.

The cross-correlation function analyzer 16 calculates the cross-correlation function between the measuring sound signal supplied from the noise memory 15 and the reflected sound supplied from the error detection microphone 11 according to a known computation expression. The cross-correlation function indicates the similarity (the correlation) between two signal sequences, specifically, the similarity (the correlation) of one signal sequence with the other signal sequence when the one signal sequence is shifted on a time axis and the cross-correlation function is represented as a time function. FIG. 5A, FIG. 5B and FIG. 6 illustrate a result of calculation of the cross-correlation function when L=1 m. FIG. 5A illustrates the positional relationship among the control speaker 10, the error detection microphone 11, and the head 5 of the passenger. FIG. 5B illustrates amplitude-frequency characteristics of the measuring sound. FIG. 6 illustrates the result of the calculation of the cross-correlation function between the measuring sound signal and the reflected sound signal detected by the error detection microphone 11. The two signal sequences exhibit a strong correlation when the time is shifted by 5.7 milliseconds (ms) and also exhibit a strong correlation when the time is further shifted. These indicate that the reflected sound reflected from the head 5 of the passenger when 5.7 ms elapsed directly reaches the error detection microphone 11 and that the reflected sound is reflected from an object, such as a wall, around the error detection microphone 11 before reaching the error detection microphone 11 and, then, reaches the error detection microphone 11.

A distance estimator 17 estimates L=5.7×340/2=97 cm (about 1 m) as the distance to the head 5 of the passenger using the minimum time at which the cross-correlation function has a high value as the reflected sound arrival time.

A coefficient setter 18 of the coefficient setting portion 14 reads out the digital filter coefficient corresponding to the distance estimated by the distance estimator 17 with reference to a filter coefficient memory 19 and sets the digital filter coefficient that is read out as a processing coefficient of the control filter 8. FIG. 7A illustrates the relationship between each distance and the area where the head 5 of the passenger exists. FIG. 7B illustrates the digital filter coefficient corresponding to each area. In the above example, the coefficient setting portion 14 determines that the head 5 of the passenger exists in an area 2 on the basis of the result of the estimation: the distance of 97 cm and sets a digital filter coefficient G2 as the processing coefficient of the control filter 8. Digital filter coefficients G1 to G3 are designed in advance as the processing coefficients of the control filter 8, with which the control sounds for reducing the noise are generated in areas 1 to 3, respectively. The digital filter coefficients G1 to G3 are stored in the filter coefficient memory 19.

Figure 8:
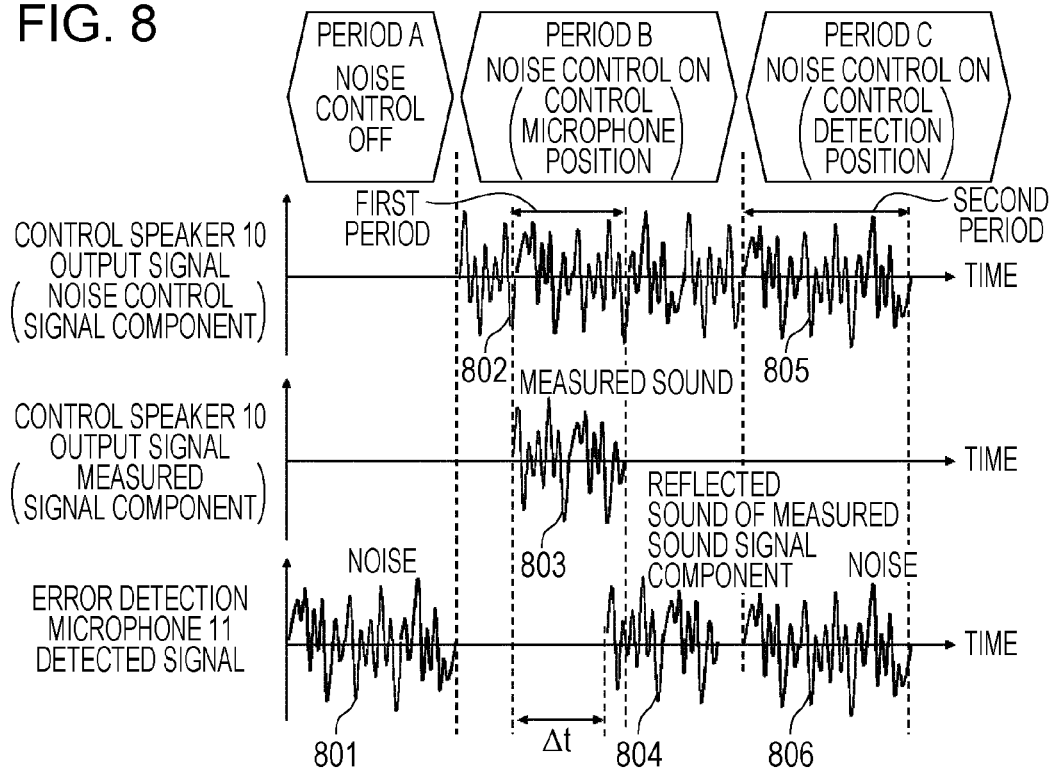
FIG. 8 illustrates how signals are temporally varied in the first embodiment.
Figure 9:
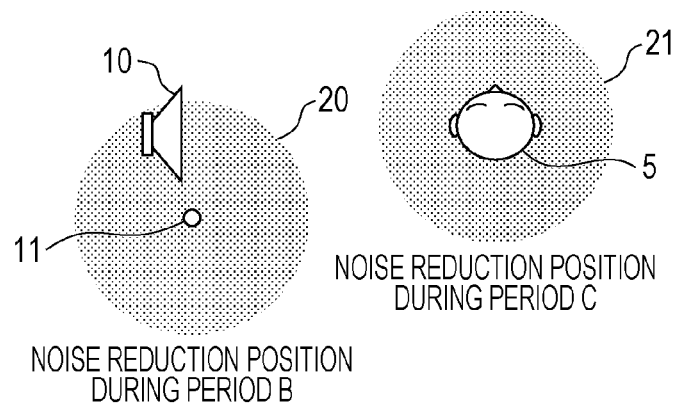
FIG. 9 illustrates a noise reduction position during each period.

As the result of update of the processing coefficient of the control filter 8 by the coefficient setting portion. 14, the position where the noise is reduced is changed from the position of the error detection microphone 11 to the position having the estimated distance. How the signal output from toe control speaker 10 and toe detected signal by the error detection microphone 11 are temporally varied through the above operation is illustrated in FIG. 8. FIG. 9 illustrates the noise reduction position during a period B, at which the position of the error detection microphone 11 is set as a noise reduction target, and the noise reduction position at which the position of the head 5 of the passenger is set as the noise reduction target.

How to control the signal output from the control speaker 10 and the detected signal by the error detection microphone 11 so as to be temporally varied will now be described with reference to FIG. 8 and FIG. 9.

First, during a period A, the output signal from the control speaker 10 is set to OFF. In this state, the noise from the noise source 6 is directly detected as a detected signal 801 in the error detection microphone 11.

Next, during the period B, an output signal 802, which is a noise control signal component, is output from the control speaker 10. Since the digital filter coefficient using the position of the error detection microphone 11 as the noise reduction position is set in the control filter 8 at this time (the noise reduction position during the period B 20 in FIG. 9), the noise signal 801 detected by the error detection microphone 11 is cancelled out by the output signal 802.

In addition, during the period B, an output signal 803, which is the measuring sound, is output from the control speaker 10 (with being added to the output signal 802). The output signal 803 at this time is the noise signal stored in the noise memory 15.

After a certain time (after Δt seconds), a detected signal 804, which is the reflected sound of the output signal 803, is detected by the error detection microphone 11. As described above, the noise signal 801 is cancelled out at the position of the error detection microphone 11 and only the detected signal 804 is detected.

During a period C, an output signal 805 when the position of the head 5 of the passenger is set as the noise reduction position is output from the control speaker 10 (the noise reduction position during the period C 21 in FIG. 9). The coefficient of the output signal 805 at this time is calculated by the signal analysis portion 13 and the coefficient setting portion 14 on the basis of the time (Δt) from the time when the output signal 803 is output from the control speaker 10 to the time when the detected signal 804 is detected by the error detection microphone 11. The calculation of the coefficient is described above in detail. At this time, the position of the head 5 of the passenger is set as the noise reduction position and a detected signal 806 is detected by the error detection microphone 11.

A period during which the output signal 802 and the output signal 803 are output from the control speaker 10 in the period B is referred to as a first period. A period during which only the output signal 805 is output from the control speaker 10 in the period C is referred to as a second period.

Figure 12:
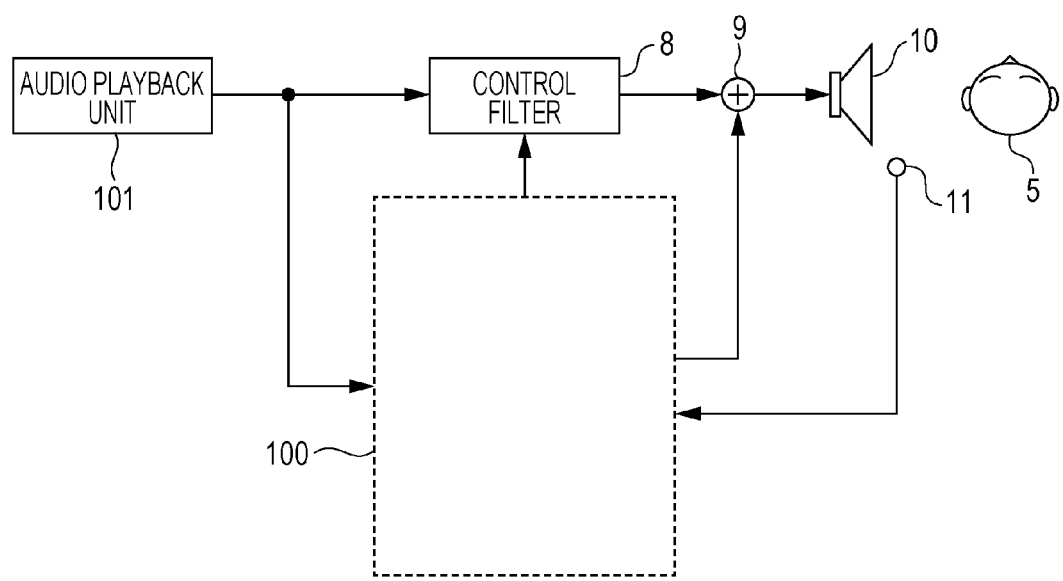
FIG. 12 illustrates a configuration in a case in which playback of an audio signal is controlled.

Although the noise control operation is performed in the configuration illustrated in FIG. 2, a configuration may be adopted in which playback of an audio signal, such as music, is controlled. FIG. 12 illustrates a configuration in which, in the control of the playback of the audio signal, the position of the head 5 of the passenger is accurately estimated to continuously achieve the sound effect of the audio playback.

Since the operation to estimate the position of the head 5 of the passenger in the configuration in FIG. 12 is the same as that in the configuration in FIG. 2, a description of the operation is omitted herein. Compared with the configuration in FIG. 2, the output from an audio playback unit 101, instead of the noise source 6 and the noise detection microphone 7, is supplied to the control filter 8 and the object position estimating unit 100 in the configuration in FIG. 12. With this configuration, the control filter 8 is capable of playing back the audio having the frequency characteristics desired by the passenger at the position of the head 5 of the passenger by applying certain frequency characteristics to the audio signal. The object position estimating unit 100 updates the processing coefficient of the control filter 8 so that the frequency characteristics desired by the passenger are kept depending on the position of the head 5 of the passenger.

Figure 13:
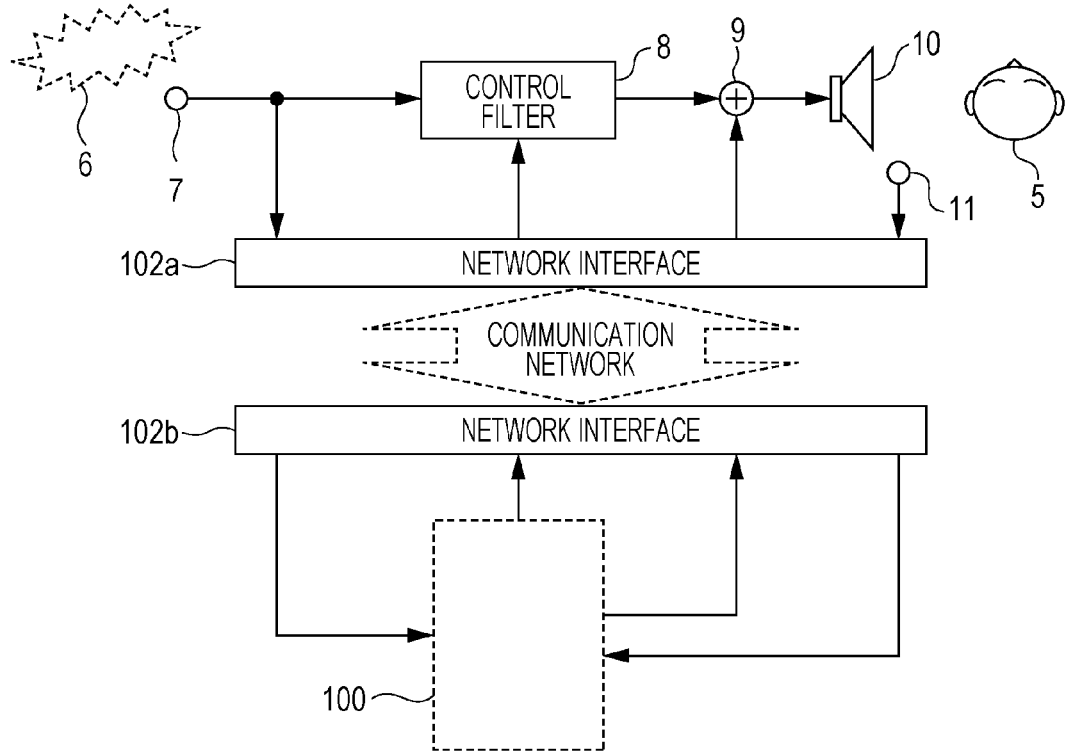
FIG. 13 illustrates a configuration in a case in which the components for noise control and the components for object position estimation are separated from each other.

The components for the noise control may be separated from the components for the object position estimation in the active noise control apparatus illustrated in FIG. 2. FIG. 13 illustrates a configuration in which the components for the noise control and the components for the object position estimation, which are separated from each other, are connected to each other via a communication network.

In the configuration in FIG. 13, the output from the noise detection microphone 7 and the output from the error detection microphone 11 are supplied to a network interface 102a. The network interface 102a supplies the output from the noise detection microphone 7 and the output from the error detection microphone 11 to a network interface 102b via the communication network. The network interface 102b supplies the output from the noise detection microphone 7 and the output from the error detection microphone 11, which are supplied via the communication network, to the object position estimating unit 100. The object position estimating unit 100 calculates the processing coefficient of the control filter 8 on the basis of the result of the estimation of the position of the head 5 of the passenger through the operation described above and supplies the calculated processing coefficient to the network interface 102b. The network interface 102b supplies the supplied processing coefficient of the control filter to the network interface 102a via the communication network. The network interface 102a sets the supplied processing coefficient of the control filter in the control filter 8. With the above configuration, since the calculation cost of the noise control and the calculation cost of the object position estimation can be dispersed, it is possible to achieve the desired effects with the low-cost arithmetic circuit.

As described above, the measuring sound is detected with the error detection microphone 11 at the noise reduction position with high accuracy, the distance to the head 5 of the passenger is estimated on the basis of the arrival time of the measuring sound reflected from the head 5 of the passenger, and the corresponding digital filter coefficient is set in the control filter 8. Accordingly, the passenger is capable of continuously achieving the noise reduction effect with the simple configuration regardless of the position of the head 5 of the passenger. In addition, since the noise stored as the measuring sound is used, no difference exists between the actual noise and the measuring sound for the passenger. As a result, the passenger does not feel uncomfortable with the measurement.

Although the noise reduction position is grouped into the three areas in FIG. 7A and FIG. 7B, a configuration may be adopted in which the noise reduction position is grouped into four or more areas to determine the noise reduction position and the processing coefficient of the control filter 8 in a more detailed manner.

Figure 10:
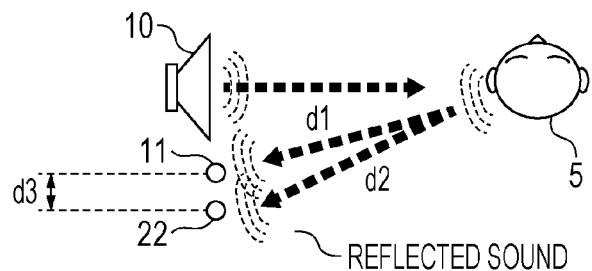
FIG. 10 illustrates the positional relationship when the direction of the head of the passenger is detected.
Figure 14:
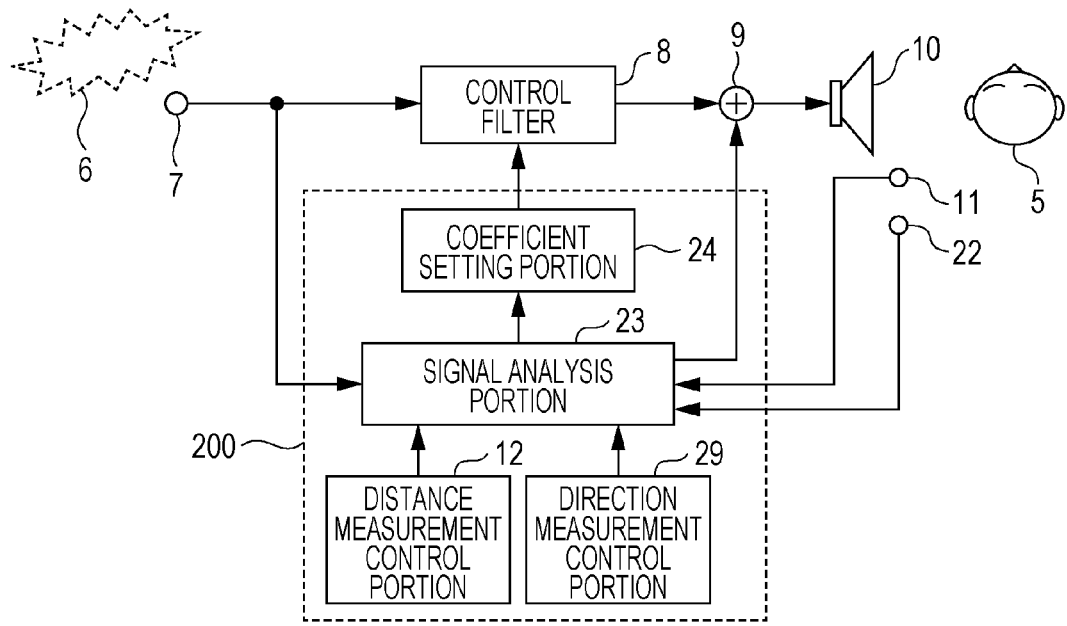
FIG. 14 illustrates a configuration of an active noise control apparatus using multiple microphones.

Furthermore, a configuration illustrated in FIG. 10 may be adopted, in which one more noise detection microphone is added and the direction of the head 5 of the passenger is detected on the basis of the difference between the arrival times of the reflected sound to the two noise detection microphones in order to more accurately estimate the position of the head 5 of the passenger. FIG. 14 illustrates a configuration of an active noise control apparatus, in which the direction is measured with a microphone 22 being added to the configuration in FIG. 2 to accurately measure the head 5 of the passenger. The same reference numerals are used in the following description to identify the same components in the active noise control apparatus in FIG. 2. A description of such components is omitted herein.

The active noise control apparatus illustrated in FIG. 14 includes the noise detection microphone 7, the control filter 8, the adder 9, the control speaker 10, the error detection microphone 11, the error detection microphone 22, and an object position estimating unit 200. The object position estimating unit 200 includes the distance measurement control portion 12, a signal analysis portion 23, a coefficient setting portion 24, and a direction measurement control portion 29. These components are only examples and part of the components may be omitted. The following description focuses on the difference from the active noise control apparatus in FIG. 2.

The error detection microphone 22 desirably has the same characteristics as those of the error detection microphone 11. All of the noise detection microphone 7, the error detection microphone 11, and the error detection microphone 22 may be integrated into the same microphone. In addition, the position where the error detection microphone 22 is provided is not limited to the position illustrated in FIG. 14. The error detection microphone 22 is desirably provided near the control speaker 10, like the error detection microphone 11. The error detection microphone 22 may be provided at a position opposing the error detection microphone 11 with the control speaker 10 sandwiched therebetween. This allows the long distance to be ensured between the error detection microphone 11 and the error detection microphone 22 to realize the distance estimation with more high accuracy.

The direction measurement control portion 29 controls an operation to measure the direction of the head 5 of the passenger with respect to the control speaker 10 on the basis of the detected signals from the error detection microphone 11 and the error detection microphone 22.

Figure 15:
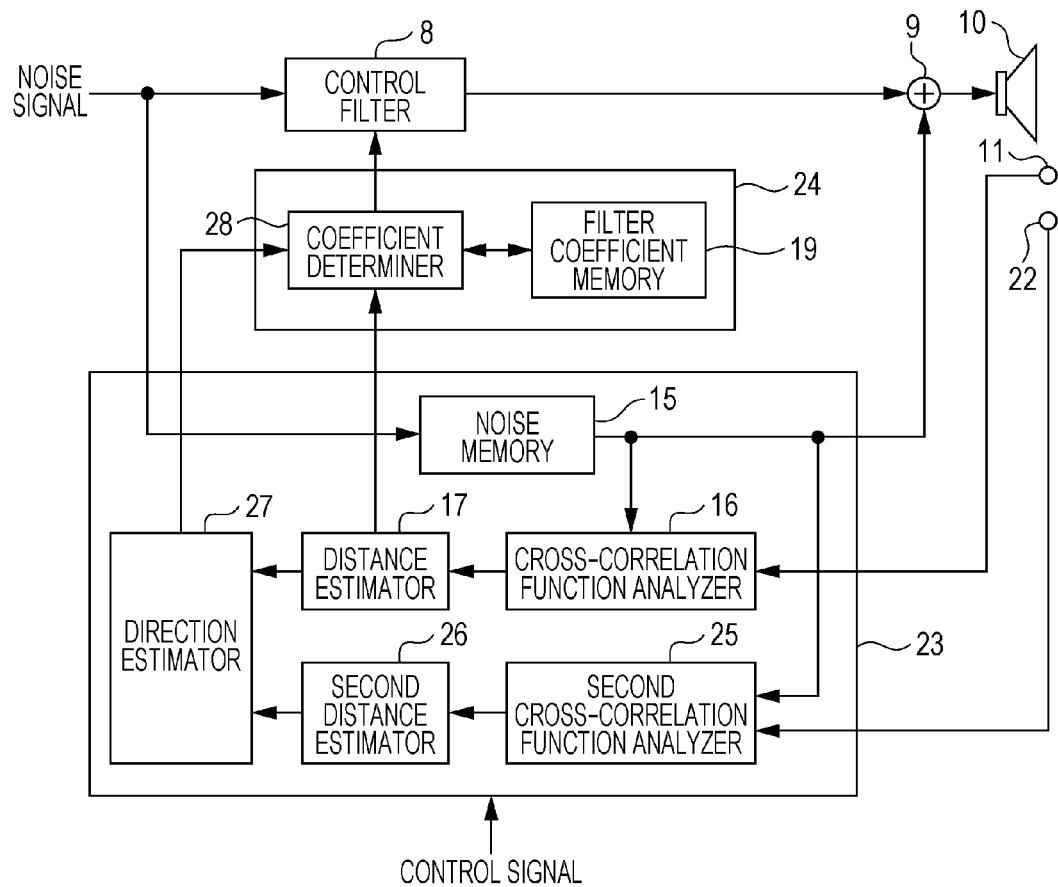
FIG. 15 illustrates the configurations of a signal analysis portion and a coefficient setting portion when the multiple microphones are used.

The signal analysis portion 23 estimates the distance between the head 5 of the passenger and the control speaker 10 on the basis of the noise signal, the detected signal by the error detection microphone 11, and the control signal from the distance measurement control portion 12. In addition, the signal analysis portion 23 estimates the direction of the head 5 of the passenger with respect to the control speaker 10 on the basis of the noise signal, the detected signals by the error detection microphone 11 and the error detection microphone 22, and the control signal from the direction measurement control portion 29. The internal configurations of the signal analysis portion 23 and the coefficient setting portion 24 will now be described with reference to FIG. 15.

The signal analysis portion 23 includes the noise memory 15, the cross-correlation function analyzer 16, the distance estimator 17, a second cross-correlation function analyzer 25, a second distance estimator 26, and a direction estimator 27. The coefficient setting portion 24 includes a coefficient determiner 28 and the filter coefficient memory 19. Since the processing in each of the noise memory 15, the cross-correlation function analyzer 16, the distance estimator 17, and the filter coefficient memory 19 is the same as the processing described above with reference to FIG. 4, a description of the processing is omitted herein. It is assumed here that the distance estimator 17 estimates a distance d1 between the head 5 of the passenger and the error detection microphone 11. The method of measuring the distance is described above with reference to FIG. 5A, FIG. 5B and FIG. 6.

The second cross-correlation function analyzer 25 calculates the cross-correlation function between the measuring sound signal supplied from the noise memory 15 and the reflected sound supplied from the error detection microphone 22 according to a known computation expression. Since the cross-correlation function is described above with reference to FIG. 5A, FIG. 5B and the FIG. 6, a description of the cross-correlation function is omitted herein.

The second distance estimator 26 estimates a distance d2 between the head 5 of the passenger and the error detection microphone 22 using a minimum time at which the cross-correlation function has a high value as the reflected sound arrival time. The method of measuring the distance is described above with reference to FIG. 5A, FIG. 5B and FIG. 6.

The direction estimator 27 calculates the direction of the head 5 of the passenger with respect to the control speaker 10 on the basis of the distance d1 between the head 5 of the passenger and the error detection microphone 11, which is estimated by the distance estimator 17; the distance d2 between the head 5 of the passenger and the error detection microphone 22, which estimated by the second distance estimator 28; and a distance d3 between the error detection microphone 11 and the error detection microphone 22, which is determined in advance.

Figure 11:
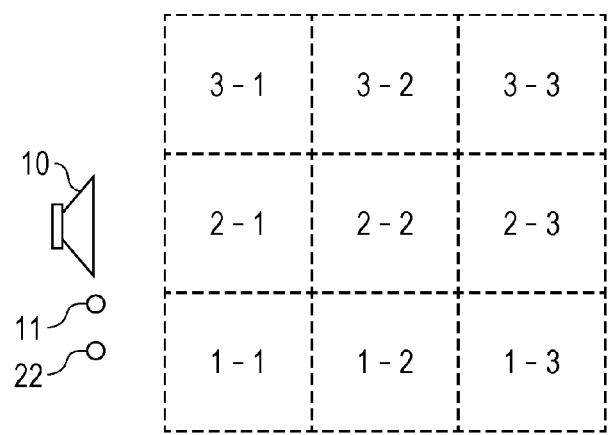
FIG. 11 illustrates areas where a digital filter is grouped when the position of the head of the passenger is accurately estimated.

The coefficient determiner 28 in the coefficient setting portion 24 reads out the digital filter coefficient corresponding to the distance estimated by the distance estimator 17 and the direction estimated by the direction estimator 27 with reference to the filter coefficient memory 19 and sets the digital filter coefficient that is read out as the processing coefficient of the control filter 8. In this case, it is assumed that the digital filter coefficients corresponding to the respective distances and directions, illustrated in FIG. 11, are stored in the filter coefficient memory 19. The subsequent processing is the same as the one described above with reference to FIG. 8 and FIG. 9.

As described above, since not only the distance between the head 5 of the passenger and the control speaker 10 but also the direction of the head 5 of the passenger with respect to the control speaker 10 can be estimated, it is possible to more accurately set the control reduction position at the position of the head of the passenger during the period C described above with reference to FIG. 8.

INDUSTRIAL APPLICABILITY

Since the active noise control apparatus according to the present disclosure reduces the noise in a desired space, the active noise control apparatus is useful for equipment in, for example, a house or an office. The active noise control apparatus is also applicable to the vehicle interior equipment in, for example, a railway or an aircraft.

The invention claimed is:
1. A control apparatus comprising:
a first microphone;
a speaker;
a processor; and
a memory that stores a computer program, which when executed by the processor, causes the processor to perform operations including:
  detecting, using the first microphone, a noise signal;
  generating a first control sound for attenuating the noise signal detected by the first microphone based on control characteristics;
  emitting, using the speaker, the first control sound and a measuring sound during a first period;
  detecting, using the first microphone, a reflected sound which is the measuring sound reflected from an object;
  estimating a position of the object based on the reflected sound,
  determining the control characteristics to attenuate the noise signal at the estimated position; and
  emitting a second control sound based on the control characteristics determined during a second period different from the first period,
  wherein the estimating includes calculating a difference from a point in time when the measuring sound is emitted from the speaker to a point in time when the reflected sound is detected by the first microphone, and estimating the position of the object based on the difference in time, and wherein the measuring sound is a portion of the noise signal.

2. The control apparatus according to Claim 1, wherein the estimating further includes calculating a coefficient to calculate the second control sound based on the estimated position of the object.

3. The control apparatus according to claim 2, wherein the memory further stores the portion of the noise signal detected by the first microphone as the measuring sound wherein the calculating of the difference includes calculating a cross-correlation function between the measuring sound that is stored in the memory and output from the speaker, and the reflected sound detected by the first microphone; and estimating a distance between the first microphone and the estimated position of the object from the calculated cross-correlation function.

4. The control apparatus according to claim 3, wherein the estimating of the distance includes estimating the distance between the first microphone and the estimated position of the object using a minimum time at which the cross-correlation function has a high value as a reflected sound arrival time.

5. The control apparatus according to Claim 1, further comprising:

a second microphone different from the first microphone, wherein a direction of the estimated position of the object is detected based on a difference between arrival times of the reflected sound to the first microphone and the second microphone.

6. A control method comprising:

detecting a noise signal using a microphone;

generating, using a processor, a first control sound for attenuating the noise signal;

emitting the first control sound and a measuring sound during a first period using a speaker;

detecting, using the microphone, a reflected sound which is the measuring sound reflected from an object;

calculating a difference from a point in time when the measuring sound is emitted to a point in time when the reflected sound is detected;

estimating a position of the object based on the difference in time, determining control characteristics for generating a second control sound for attenuating the noise signal at the estimated position; and emitting, using the speaker, the second control sound based on the control characteristics during a second period different from the first period, wherein the measuring sound is a portion of the noise signal.

* * * * *